United States Patent
Yan et al.

(10) Patent No.: US 8,879,418 B2
(45) Date of Patent: Nov. 4, 2014

(54) METHOD AND APPARATUS FOR UPDATING DNS OF HOST IN IPV6 STATELESS ADDRESS CONFIGURATION

(75) Inventors: Renxiang Yan, Shanghai (CN); Yinglan Jiang, Shanghai (CN); Qingshan Zhang, Shanghai (CN); Fanxiang Bin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1943 days.

(21) Appl. No.: 11/722,180

(22) PCT Filed: Dec. 20, 2005

(86) PCT No.: PCT/CN2005/002247
§ 371 (c)(1),
(2), (4) Date: Sep. 4, 2008

(87) PCT Pub. No.: WO2006/066497
PCT Pub. Date: Jun. 29, 2006

(65) Prior Publication Data
US 2009/0274062 A1    Nov. 5, 2009

(30) Foreign Application Priority Data

Dec. 20, 2004 (CN) .......................... 2004 1 0093288

(51) Int. Cl.
*H04L 12/28* (2006.01)
*G06F 15/177* (2006.01)
(52) U.S. Cl.
USPC .......................................... 370/254; 709/221
(58) Field of Classification Search
CPC .............. H04L 29/12066; H04L 61/1511; H04L 29/12301; H04L 61/2076
USPC ............................ 370/254, 351; 709/220, 221
See application file for complete search history.

(56) References Cited

U.S. PATENT DOCUMENTS 6,804,720 B1 * 10/2004 Vilander et al. ............... 709/229
7,266,090 B2 * 9/2007 Sawada et al. ................. 370/254
(Continued)

FOREIGN PATENT DOCUMENTS

| CN | 1435974 A | 8/2003 |
| KR | 369326 | 1/2003 |
| WO | WO 03/107627 A1 | 12/2003 |

OTHER PUBLICATIONS

European Search Report for PCT/CN2005002247 Nov. 20, 2009.
(Continued)

*Primary Examiner* — Ayaz R. Sheikh
*Assistant Examiner* — Hoang-Chuong Vu
(74) *Attorney, Agent, or Firm* — Wolff & Samson, PC

(57) ABSTRACT

Disclosed is a method for updating DNS of host in IPv6 stateless address auto-configuration, wherein an option is added in the RS message sent by a host and/or RA message sent by a router, said option including information for negotiation of updating DNS of host. Based on said information, the host negotiates with the router to determine whether the host or the router register, the mapping between the global address of the host and the full domain name of the host, to a DNS server, to complete updating the DNS of the host. This invention enables the host to correctly identify the matching relation between domain name suffix information and address prefix, and achieves the negotiation of updating DNS domain name between the host and the router. Since DNS updating is performed by a router instead of the host, the DNS updating would become simple and safe.

16 Claims, 2 Drawing Sheets

(56) References Cited

U.S. PATENT DOCUMENTS

| | | | |
|---|---|---|---|
| 7,437,474 B2* | 10/2008 | Iyer et al. | 709/238 |
| 7,493,652 B2* | 2/2009 | Aura | 726/2 |
| 7,562,384 B1* | 7/2009 | Huang | 726/5 |
| 7,752,653 B1* | 7/2010 | Droms et al. | 726/3 |
| 7,788,407 B1* | 8/2010 | Venkat et al. | 709/245 |
| 2002/0199015 A1* | 12/2002 | Tari et al. | 709/238 |
| 2003/0026230 A1* | 2/2003 | Ibanez et al. | 370/338 |
| 2003/0145073 A1 | 7/2003 | Lee | |
| 2003/0223422 A1* | 12/2003 | Igarashi et al. | 370/390 |
| 2004/0004967 A1* | 1/2004 | Nakatsugawa et al. | 370/400 |
| 2004/0083306 A1* | 4/2004 | Gloe | 709/245 |
| 2004/0114554 A1* | 6/2004 | Okajima et al. | 370/329 |
| 2004/0148398 A1* | 7/2004 | Park | 709/227 |
| 2004/0230446 A1* | 11/2004 | Park et al. | 705/1 |
| 2004/0258022 A1* | 12/2004 | Julka et al. | 370/331 |
| 2005/0020265 A1* | 1/2005 | Funabiki et al. | 455/436 |
| 2005/0041634 A1* | 2/2005 | Aura | 370/351 |
| 2005/0111377 A1* | 5/2005 | Lioy et al. | 370/252 |
| 2005/0169249 A1* | 8/2005 | Shirota et al. | 370/352 |
| 2005/0226180 A1* | 10/2005 | Devarapalli et al. | 370/328 |
| 2005/0265259 A1* | 12/2005 | Thubert et al. | 370/255 |
| 2007/0189219 A1* | 8/2007 | Navali et al. | 370/331 |
| 2011/0164498 A1* | 7/2011 | Giaretta et al. | 370/232 |

OTHER PUBLICATIONS

S. Thomson et al, "IPv6 Stateless Address Autoconfiguration; rfc246.2.txt", IETF Standard, Internet Engineering Task Force, IETF, CH, Dec. 1, 1998, XP0105008246.

Renxiang Yan et al, "DNS update in IPv6 stateless configuration; draft-yan-ipv6-ra-dns-00.txt", IETF Standard Working-Draft, Internet Engineering Task Force, IETF, CH, Jan. 20, 2005, XP015037094.

* cited by examiner

METHOD AND APPARATUS FOR UPDATING DNS OF HOST IN IPV6 STATELESS ADDRESS CONFIGURATION

FIELD OF THE INVENTION

The present invention relates to IPv6 applications in a communication network and a computer network, and more particularly, to a method for updating DNS (domain name server) of host in IPv6 stateless address configuration.

BACKGROUND OF THE INVENTION

The deployment of IPv6 has dramatically reduced address pressure in IPv4. However, a 128-bit IPv6 address is not so easy to remember as an IPv4 address, and domain names will be put into more extensive applications in IPv6. Currently, there are two methods for configuring domain name information in IPv6: (1) to manually add the mapping relation between an address and a domain name to a DNS server; (2) to automatically update a domain name using FQDN (fully qualified domain name) options in the DHCP protocol (dynamic host configuration protocol). Method (1) needs manual intervention and is thus hardly competent for a large number of hosts. Method (2) is merely applicable to hosts that configure addresses using DHCP.

There are two kinds of address configuration manners in IPv6, namely stateful address configuration and stateless address configuration. The stateful address configuration manner means configuration of address and other information by the DHCP protocol. Similar to IPv4, this method needs a DHCP server from which the host obtains information on address configuration in client/server mode.

The stateless address auto-configuration is a characteristic address configuration manner for IPv6. In this manner, the network interface requiring address configuration obtains a link local address using neighbor discovery mechanism first, and after obtaining the link local address, the network interface sends a router solicitation (hereinafter referred to as RS) message to a full router multicast address. The local router transfers the prefix of one or more global addresses to the host by router advertisement (hereinafter referred to as RA) message. Finally, the host combines the obtained address prefix and the interface identifier to get a global address. The router may also periodically send a RA message, and the host, upon acquisition of the message, configures the interface's global address in accordance with the address prefix.

The stateless address configuration method used in IPv6 is a distinct advantage of IPv6, which enables the host device to obtain the IPv6 address without manual configuration or DHCP server maintenance.

However, there is so far no method for automatically updating DNS for a host that configures addresses using a stateless address configuration method. The existing IPv6 router advertisement based DNS auto-configuration is an obsolete draft and has following deficiencies not to be ignored:

On the one hand, since this method does not specify the matching relation between domain name suffix information and address prefix, if the router has issued a plurality of address prefixes, then the host cannot correctly identify the matching relation;

On the other hand, it is the host that automatically updates a DNS domain name according to this method, which will cause security pitfalls. Even if security guarantee is implemented using the DNSsec method, corresponding authentication information needs to be installed on each host, which will make the DNS updating very complicated.

SUMMARY OF THE INVENTION

It is an object of the present invention to provide a reliable and effective method for updating DNS of host in IPv6 stateless address configuration, which method enables the host to correctly identify the matching relation between domain name suffix information and address prefix, and achieves the negotiation of updating DNS domain name between the host and the router. Since DNS updating is performed by a router instead of the host, the DNS updating would become simple and safe.

To achieve the object, the basic idea of the present invention is to define a new RS/RA option—"host FQDN" option which is used to enable the host to negotiate with the router to update DNS domain name, i.e. either the host or the router may implement the updating. Meanwhile, it is to specify the matching relation between domain name suffix information and address prefix in the RA message so that the host can easily identify which address matches which domain name suffix.

To this end, the present invention provides a method for updating DNS of host in IPv6 stateless address configuration, characterized by, adding an option in the RS message sent by a host and/or RA message sent by a router, said option including information for negotiation of updating DNS of host;

based on said information, the host negotiating with the router to determine whether the host or the router register, the mapping between the global address of the host and the full domain name of the host, to a DNS server, to complete updating the DNS of the host.

The present invention further provides a method for updating DNS of host in IPv6 stateless address configuration, characterized by, adding an option in the RA message sent by a router to a host, said option in the RA message including domain name suffix information of the host, in the RA message, the option being placed after corresponding one or more address prefix option(s), to indicate that the option and said one or more address prefix form a match, based on the match, the host using the domain name suffix information to form its full domain name, using the matched address prefix to construct a global address, and mapping the full domain name to the global address, the host or the router registering, the mapping between the global address of the host and the full domain name of the host, to a DNS server, to complete updating the DNS of the host.

The present invention further provides an IPv6 stateless address configuration system, comprising a host and a router, said host including a network interface module, a processing module, and a memory module, the router including a network interface module, a processing module, and a memory module, characterized in that, the processing module of the host sends a RS message via the network interface module of the host, the processing module of the router sends a RA message via the network interface module of the router, the RS message and/or the RA message includes an option including information for negotiation of updating DNS of host;

by means of the respective processing modules, network interface modules, and memory modules, based on said information, the host negotiates with the router to determine whether the host or the router register, the mapping between the global address of the host and the full domain name of the host, to a DNS server, to complete updating the DNS of the host.

The present invention further provides a host for use in an IPv6 stateless address configuration system, including a network interface module, a processing module, and a memory module, said system further comprising a router including a network interface module, a processing module, and a memory module, characterized in that, the processing module of the host sends a RS message via the network interface module of the host, and receives a RA message sent by the processing module of the router via the network interface module of the router, the RS message and/or the RA message includes an option including information for negotiation of updating DNS of host;

based on said information, the host via its processing module, network interface module, and memory module, negotiates with the router via its processing module, network interface module, and memory module, to determine whether the host or the router register, the mapping between the global address of the host and the full domain name of the host, to a DNS server, to complete updating the DNS of the host.

The present invention further provides a router for use in an IPv6 stateless address configuration system, including a network interface module, a processing module, and a memory module, said system further comprising a host including a network interface module, a processing module, and a memory module, characterized in that, corresponding to a RS message sent by the processing module of the host via the network interface module of the host, the processing module of the router sends a RA message via the network interface module of the router, the RS message and/or the RA message includes an option including information for negotiation of updating DNS of host;

based on said information, the router via its processing module, network interface module, and memory module, negotiates with the host via its processing module, network interface module, and memory module, to determine whether the host or the router register, the mapping between the global address of the host and the full domain name of the host, to a DNS server, to complete updating the DNS of the host.

BRIEF DESCRIPTION ON THE DRAWINGS

Hereinafter, the preferred embodiments of the present invention will be described with reference to the accompanying drawings, wherein.

DESCRIPTION OF THE PREFERRED EMBODIMENTS

Figure 3:
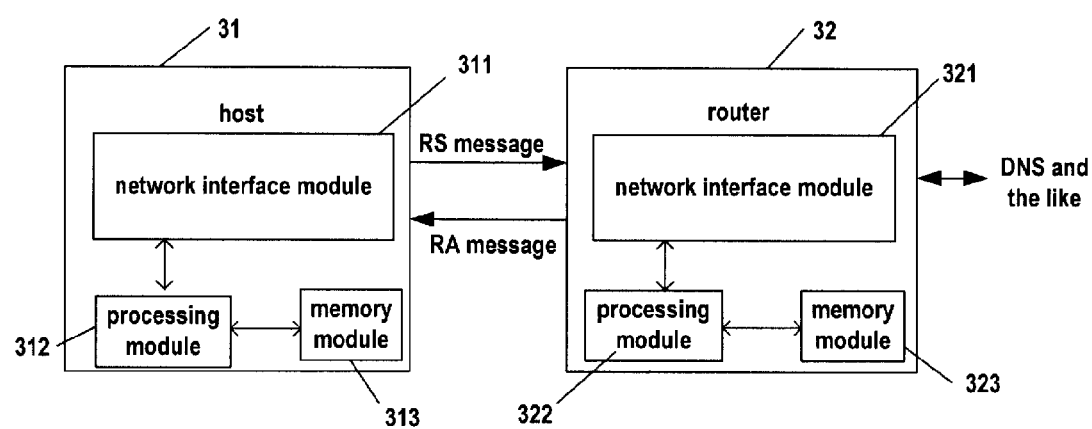
FIG. 3 is a schematic block diagram of a host and router according to the present invention.

FIG. 3 depicts a schematic block diagram of a host and router according to the present invention, in which a host 31 and a router 32 receives and sends RS messages and RA messages via network interface modules 311 and 321. Processing modules 312, 322 and memory modules 313, 323 of both host 31 and router 32 take part in respective operations.

The DNS updating may be implemented by host 31 or by router 32 instead of host 31, the DNS updating includes updating the mapping from domain name to address (forward mapping) and updating the mapping from address to domain name (reverse mapping). Theoretically, host 31 and router 32 may implement forward updating, reverse updating or both forward and reverse updating. However, not all matches make sense in reality. In the present invention, assuming the working modes of updating DNS include the following:

1. the IPv6 host updates AAAA resource records (i.e. forward mapping) and PTR resource records (i.e. reverse mapping)
2. the IPv6 router updates AAAA resource records (i.e. forward mapping) and PTR resource records (i.e. reverse mapping)

The difference between mode 1 and mode 2 is whether the host or the router updates AAAA resource records and PTR resource records. The definition of these two modes is out of consideration for security. The negotiation of updating DNS to be mentioned later refers, in particular, to the negotiation of updating AAAA resource records and PTR resource records.

"Host FQDN" Option

Definition of "Host FQDN" Option

In order to implement the updating of DNS domain name, the router or the host needs to know the full domain name (FQDN) corresponding to a certain IPv6 address. "Host FQDN" option enables the host and the router to know such information and negotiate who will update DNS based on the flag bit therein.

This option can only be contained in the RS and RA message, with a smallest length of four bytes.

The format is as follows:

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |     type      |     length    |           flag field          |
   +-+-+-+-+-+-+-+-+-+-+-+-+-+-+-+-+-+-+-+-+-+-+-+-+-+-+-+-+-+-+-+-+
   |                                                               |
   .                          domain name                          .
   .                                                               .
   +-+-+-+-+-+-+-+-+-+-+-+-+-+-+-+-+-+-+-+-+-+-+-+-+-+-+-+-+-+-+-+-+

Type: an 8-bit value for indicating this option
```

Length: the length of flag bit (1)+the length of domain name

Flag field: for negotiation of updating DNS between the host and the router and for defining the number of matches Domain name: partial domain name or full domain name Definition of Flag Field The flag field is for negotiation of updating DNS domain name between host 31 and router 32 and for defining the number of matches.

The flag field is defined as follows:

```
         0 1 2 3 4 5 6 7
         +-+-+-+-+-+-+-+-+
         |RV |  MNUM |R|H|
         +-+-+-+-+-+-+-+-+
```

The RV field is a reserved bit and may be used for future extension.

MNUM, the field for the number of matches: its size is 4 bits and used for defining the number of address prefixes which a FQDN option can match at most, and its value ranges between 1 and 16.

Use of R bit: if the router desires to update DNS instead of the host, then it sets R bit to 1 when sending "host FQDN" option, otherwise it sets R bit to 0.

Use of H bit: the host notifies the router to update DNS instead of itself by setting H bit. When R bit is set to 0 and the host is unable to perform DNS registration, the host will set R bit to 1 and H bit to 1 also in the loopback RS message. Otherwise, the host sets R bit to 0 and H bit to 0 also.

Illustration of Domain Name in Option

The domain name field in the option can transmit partial domain name or full domain name. The host uses full domain name or partial domain name, namely host name, when carrying this option in the RS message, whereas the router uses partial domain name, namely domain name suffix, when carrying this option in the RA message.

Use of "Host FQDN" Option

Host 31 carries "host FQDN" option only when processing module 312 sends the RS message via network interface module 311.

Router 32 carries "host FQDN" option only when processing module 322 sends the RA message via network interface module 321. When the router sends "host FQDN" option, the "host FQDN" option must match a certain address prefix option by means of processing module 322 and memory module 323, whereas it is not necessary for an address prefix to match a certain "host FQDN" option. The "host FQDN" option must be placed after one or more address prefix options, to indicate that it and the one or more address prefixes form a match. The MNUM field in the option is used for indicating the number of address prefixes that match the option, and unmatched address prefixes must be placed after the matched address prefixes and the "host FQDN" option. Such a method enables the host to easily identify the matching between address prefix and domain name suffix and further enables the host to map its full domain name to the global address constructed using the matched address prefix, so as to update the mapping when processing module 312 of the host updates DNS via network interface module 311. Such a matching method may also be applicable to other methods for updating DNS with or without negotiation.

If the router is set to update DNS, then it may or may not carry domain name field when sending the "host FQDN." Upon receipt of the RA message, the host, by means of processing module 312 and memory module 313, maps the address generated by the address prefix to the domain name in the "host FQDN" option that matches the address prefix. The mapping may be updated by the host or the router based on the R and H bits in the set flag field.

Host 31 receives a RA message via network interface 311. The RA message may be an acknowledgement for the RS message sent from the router 32 to the host or may be a periodic RA broadcast of the router. The router will set the corresponding flag bit by processing module 322 based on the configuration condition thereof.

If host 31 supports the "host FQDN" option, then it will carry the "host FQDN" option in the RS message, and sets the corresponding flag bit by the processing module 312 based on the method in the flag bit definition.

Figure 1:
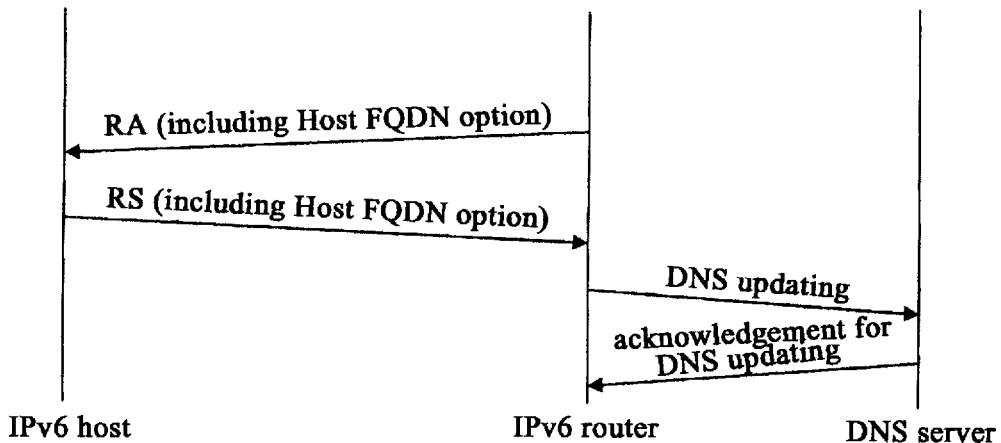
FIG. 1 is a schematic view of a working flow for updating DNS by an IPv6 router in the present invention.

If R bit is 1, i.e. it is the router that updates DNS, then the host will send a RS message carrying the "host FQDN" to the router, and the source address thereof must be the address generated by the address prefix matching domain name. If there are more than two matches, then it must send a RS message for each match. Afterwards, the router updates DNS based on the corresponding mapping, as depicted in FIG. 1.

Figure 2:
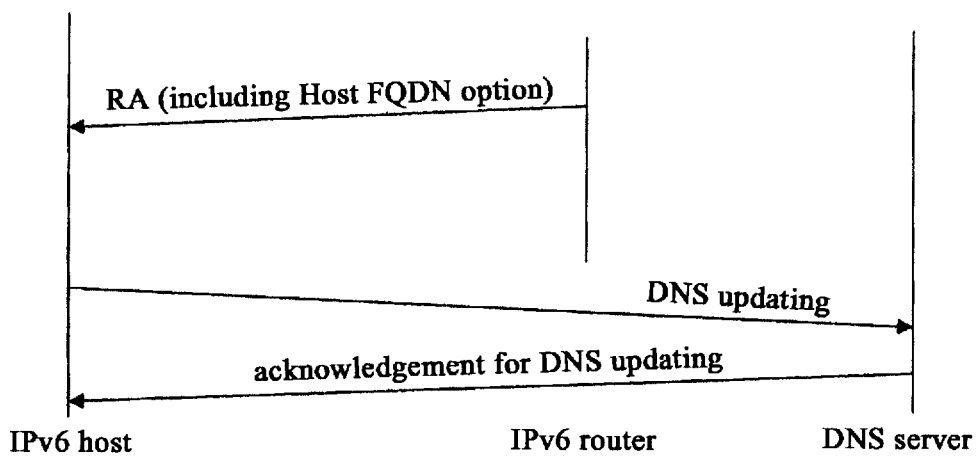
FIG. 2 is a schematic view of a working flow for updating DNS by a host in the present invention.

If R is 0, then the host that supports the DNS domain name registration must register domain name by itself, i.e. maps the full domain name to the global address constructed by the matched address prefix and then updates the mapping, as depicted in FIG. 2. The host that does not support the DNS domain name registration may notify the router to perform registration for it by sending the "host FQDN" option whose H bit and R bit are both set to 1.

Various alterations and modifications may be made without departing from the spirit and scope of the present invention. It is to be understood that the present invention is not limited to the specific embodiments and the scope thereof is as defined in the appended claims.

What is claimed is:

1. A method for updating a domain name system (DNS) of a host in IPv6 stateless address auto-configuration, said method comprising:

adding an option in a router solicitation (RS) message sent by a host and/or a router advertisement (RA) message sent by a router, said option including information for negotiating an update of the DNS of the host;

based on said information, the host negotiating with the router to determine whether the host or the router register a mapping between a global address of the host and a full domain name of the host, to a DNS server, to complete updating the DNS of the host, wherein the option in the RA message includes domain name suffix information of the host, and in the RA message, the option being placed after one or more corresponding address prefix option(s), to indicate that the option and said one or more address prefix option(s) form a match, and wherein an unmatched address prefix option is placed after a matched address prefix option and the option.

2. The method according to claim 1, wherein the router updates the DNS based on the information for the negotiating.

3. The method according to claim 2, wherein upon receipts of the RA message, the host completes mapping the global address to a host domain name thereof and sends the RS message, in which the option further includes the host domain name of the host, to the router, and the router completes the mapping between the global address of the host and the full domain name of the host thereof.

4. The method according to claim 1, wherein the host updates the DNS based on the information for the negotiating.

5. The method according to claim 4, wherein if the host does not support the DNS updating, then the host will notify the router through the information for the negotiating to update the DNS.

6. The method according to claim 1, wherein the option includes information for indicating a number of address prefix option(s) that match the option.

7. The method according to claim 1, wherein the RA message may be acknowledgement for the RS message sent from the router to the host or may be periodic RA broadcast of the router.

8. The method according to claim 7, wherein the host completes the mapping between the global address of the host and the full domain name of the host thereof based on the RA message, and the host or the router updates the DNS based on the information for the negotiating.

9. The method according to claim 8, wherein the host updates the DNS based on the information for the negotiating.

10. The method according to claim 8, wherein based on the information for the negotiating, the router updates the DNS, the host sends the RS message to the router, and the option in the RS message further includes the full domain name of the host.

11. The method according to claim 8, wherein based on the information for the negotiating, the router updates the DNS, the host completes mapping the global address to a host domain name thereof and sends the RS message, in which the option further includes a host name of the host, to the router, and the router completes the mapping between the global address of the host and the full domain name of the host thereof.

12. A method for updating a domain name system (DNS) of a host in IPv6 stateless address configuration, the method comprising:

adding an option in a router advertisement (RA) message sent by a router to a host, said option in the RA message including domain name suffix information of the host, in the RA message, the option being placed after one or more corresponding address prefix option(s), to indicate that the option and said one or more address prefix option(s) form a match, based on the match, the host using a domain name suffix to form its full domain name, using the matched address prefix option(s) to construct a global address, and mapping the full domain name to the global address, and negotiating between the host and router whether the host or the router registers the mapping between the global address of the host and the full domain name of the host, to a DNS server, to complete updating the DNS of the host, wherein an unmatched address prefix option is placed after a matched address prefix option and the option.

13. The method according to claim 12, wherein the option includes information for indicating a number of address prefix option(s) that match the option.

14. An IPv6 stateless address configuration system, the system comprising:
  a host; and
  a router,
  wherein said host comprises a first network interface module, a first processing module, and a first memory module,
  wherein the router comprises a network interface module, a processing module, and a memory module,
  wherein the first processing module of the host sends a router solicitation (RS) message via the first network interface module of the host, and the processing module of the router sends a router advertisement (RA) message via the network interface module of the router, wherein the RS message and/or the RA message includes an option including information for negotiating an update of a domain name system (DNS) of the host, and
  wherein by means of the respective processing modules, network interface modules, and memory modules, based on said information, the host negotiates with the router to determine whether the host or the router register a mapping between a global address of the host and a full domain name of the host, to a DNS server, to complete updating the DNS of the host, wherein the option in the RA message includes domain name suffix information of the host, and in the RA message, the option being placed after one or more corresponding address prefix option(s), to indicate that the option and said one or more address prefix option(s) form a match, and wherein an unmatched address prefix option is placed after a matched address prefix option and the option.

15. A host in an IPv6 stateless address configuration system, the host comprising a first network interface module; a first processing module; and a first memory module, and said system further comprising a router comprising: a second network interface module; a second processing module; and a second memory module,
  wherein the first processing module of the host sends a router solicitation (RS) message via the first network interface module of the host, and receives a router advertisement (RA) message sent by the second processing module of the router via the second network interface module of the router, the RS message and/or the RA message includes an option including information for negotiating an update of a domain name system (DNS) of the host, and
  wherein based on said information, the host via its first processing module, first network interface module, and first memory module, negotiates with the router via its second processing module, second network interface module, and second memory module, to determine whether the host or the router register a mapping between a global address of the host and a full domain name of the host, to a DNS server, to complete updating the DNS of the host, and wherein the option in the RA message includes domain name suffix information of the host, and in the RA message, the option being placed after one or more corresponding address prefix option(s), to indicate that the option and said one or more address prefix option(s) form a match, and wherein an unmatched address prefix option is placed after a matched address prefix option and the option.

16. A router in an IPv6 stateless address auto-configuration system, the router comprising: a first network interface module, a first processing module, and a first memory module, said system further comprising a host comprising: a second network interface module, a second processing module, and a second memory module, wherein, in response to a router solicitation (RS) message sent by the second processing module of the host via the second network interface module of the host, the first processing module of the router sends a router advertisement (RA) message via the first network interface module of the router, the RS message and/or the RA message includes an option including information for negotiating an update of a domain name system (DNS) of the host;

based on said information, the router via the first processing module, the first network interface module, and the first memory module, negotiates with the host via the second processing module, the second network interface module, and the second memory module, to determine whether the host or the router register a mapping between a global address of the host and a full domain name of the host, to a DNS server, to complete updating the DNS of the host, wherein the option in the RA message includes domain name suffix information of the host, and in the RA message, the option being placed after one or more corresponding address prefix option(s), to indicate that the option and said one or more address prefix option(s) form a match, and wherein an unmatched address prefix option is placed after a matched address prefix option and the option.

* * * * *